Feb. 22, 1955     D. R. DE BOISBLANC     2,702,476
APPARATUS FOR MEASURING LIQUID LEVEL
Filed Dec. 26, 1950
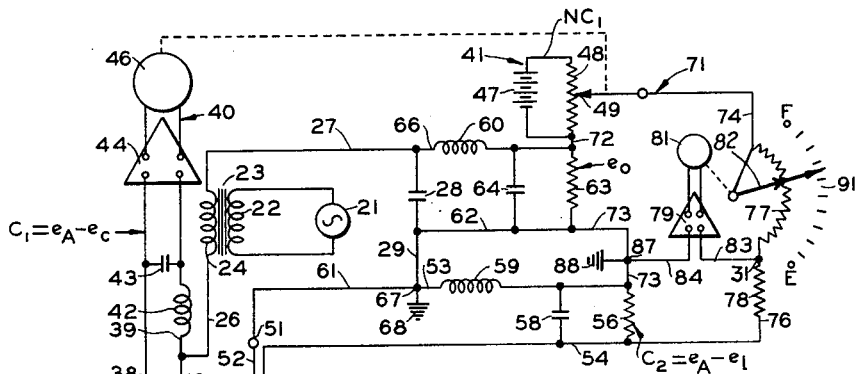
INVENTOR.
D. R. DE BOISBLANC
BY Hudson & Young
ATTORNEYS

United States Patent Office 2,702,476
Patented Feb. 22, 1955

2,702,476

APPARATUS FOR MEASURING LIQUID LEVEL

Deslonde R. de Boisblanc, Bartlesville, Okla., assignor to Phillips Petroleum Company, a corporation of Delaware Application December 26, 1950, Serial No. 202,645

10 Claims. (Cl. 73—295)

This invention relates to the measurement of the level of a liquid body. In one embodiment this invention relates to an electrically operated liquid level measuring device.

My invention is concerned with the measurement and indication of level of a liquid body, employing a plurality of thermocouple junctions, while heated by alternating current, positioned in part in the liquid body and in remaining part above the liquid.

An object of my invention is to provide an improved liquid level gauge. Another object is to provide for the utilization of a plurality of thermocouples and associated electrical circuits in measuring the level of a liquid body. Another object is to provide a liquid level gauge that can be used in the measurement of level of a body of liquid independently of the temperature of the liquid. Another object is to provide for measurement of the level of a liquid body as a function of E. M. F. generated by a plurality of thermocouple junctions. Another object is to provide a remote indicating liquid level gauge. Other objects will be apparent to one skilled in the art from the accompanying disclosure and discussion.

I have provided in accordance with my invention apparatus for measuring and indicating the level of a body of liquid. In a broad embodiment, my invention provides a liquid level gauge assembly comprising a plurality of thermocouple pairs, each pair comprising a hot junction and a cold junction, disposed one above another so that a portion of the plurality of thermocouple pairs is positioned above the liquid body in an area adjacent thereto, and the remaining portion is positioned in the liquid. An alternating current source is provided for passage of alternating current through the plurality of junctions so as to heat them. In this manner the E. M. F. generated by each pair of hot and cold junctions is regulated and maintained at any desired level and the accuracy of measurement of such E. M. F. values is greatly increased. Selected direct current potentials generated from the plurality of thermocouple junctions are correlated in a manner in accordance with one of several embodiments of my invention to provide a continuous measurement and indication of the level of the liquid body.

In the attached drawings are illustrated various embodiments of my invention. Figure 1 is a schematic illustration of a liquid level gauge assembly showing a computing circuit and a multiplying circuit connected with a plurality of thermocouples connected in series, part of which plurality is positioned in a body of liquid and the remaining part of which extends upwardly from the liquid body. The assembly of Figure 1 can be used for remote indication of the level of the liquid body. Figure 2 schematically illustrates another form of my invention, providing for a plurality of separate thermocouple junction pairs spaced apart in an upright direction, part of the plurality being present in the liquid and the remaining part extending upwardly therefrom. The embodiment of Figure 2 also provides for a remote indication of the level of the liquid body. Figure 3 illustrates still another form of my invention wherein a plurality of separate thermocouple junction pairs have a common cold junction, the plurality of junctions being disposed with respect to a liquid body as described with respect to the plurality of thermocouples of Figure 2. In the embodiment of each of the figures, an alternating current is passed through the plurality of thermocouples and filtering means is provided for measuring the direct current potential developed across certain specified thermocouples or groups thereof, so that the separate direct current circuits thus obtained are correlated in a manner to provide an index of the level of the liquid body. It is to be understood that the schematic illustrations of Figures 1, 2 and 3 are diagrammatic only and can be altered in many respects by those skilled in the art and yet remain within the intended scope of my invention.

Referring then to Figure 1, a conduit 9, having side wall 10 in liquid body 13 contained in tank 12, is surrounded with a heat insulating sheath 11 which may be of plastic or fiber material not readily dissolved in liquid 13, the level 14 of which is to be measured as described hereafter. Conduit 9 is a high thermal conductivity material such as copper, silver, or brass, or the like, and is mounted by any means desired (not shown) in tank 12. Conduit 9 is used for housing certain electrical leads described hereafter although such leads can be covered with suitable protecting material and extended upwardly through the liquid body without further protection as desired. Drilled spaces 16 are disposed longitudinally in side wall 10, preferably evenly spaced, to provide holders for the cold junctions of the plurality of thermocouples described hereafter. The plurality 17 of thermocouples comprises a series of thermocouple junctions connected in series, and alternately as hot and cold junctions, and is disposed in an upright direction in tank 12 so that a portion of the plurality is present in the liquid body at all times and so that the remaining portion extends upwardly from the liquid body into the adjacent space thereabove. Junction 51 outside tank 12 and described hereafter is also a cold junction and operates as a member of plurality 17. The cold junctions 18 are mounted in spaces 16 and are insulated from the side wall 10 by any suitable means, as for example a plastic body or "Bakelite" type insulating means, in such a manner that the cold junctions 18 are inside the container wall 10 but are insulated both electrically and thermally therefrom. The hot junctions 19 of the plurality 17 of the junctions are positioned outside the side wall 10 and sheath 11 and are in direct contact with the liquid or space adjacently above, as the case may be.

Various types of thermocouple junctions can be utilized as desired. Although couples such as iron-platinum, Chromel-Alumel, iron-constantan, copper-constantan or the like can be used, I prefer generally to employ the last, and in any event will refer illustratively to the use of that thermocouple system in the discussion of the figures.

Alternating current from source 21 is applied to the primary coil 22 of transformer 23. The secondary coil 24 of transformer 23 is connected with the plurality 17 of thermocouple junctions via copper leads 26 and 27. The alternating current path from the top of secondary coil 24 is through copper conductor 27, condenser 28, copper conductors 29 and 61, thermocouple junction 51, constantan conductor 52 to the lowest hot junction 19p in liquid 13 via the plurality of cold and hot junctions 19 and 18 in series, and then through copper conductor 26 connected to the bottom of the secondary coil 24. This alternating current circuit affords a means of heating the plurality of thermocouple junctions 17, by which I mean to include junction 51, the alternating current being passed through the entire series.

A first direct current circuit contains a junction pair in an upper portion of said plurality 17 of thermocouple junctions, preferably the uppermost pair, as for example junctions 18a and 19a. Junctions 18a and 19a are connected with leads 38 and 39 in communication with multiplying circuit 41. Choke coil 42 in lead 39 and condenser 43 across leads 38 and 39 prevent flow of alternating current through the said first direct current circuit. Communicating means 40 comprises a direct current amplifier 44 actuated by potential in the first direct current circuit, i. e., from leads 38 and 39, operatively connected with a motor 46 of the "Servo" type so as to rotate the shaft thereof in response to the potential applied to the amplifier 44 from leads 38 and 39. Multiplying circuit 41 is a potentiometer comprising battery 47 and variable resistance 48. The maximum E. M. F. across resistance 48 is made equal to the product of the maximum possible E. M. F. of the said first circuit and the number of junctions 18 in said plurality 17 of thermocouples. A wiper 49 is operatively connected to the shaft of motor 46 and adapted to be moved over variable resistance 48 in response to potential applied to amplifier 44 from the said first circuit.

A second direct current circuit contains a single junction 19p of the plurality 17 of thermocouple junctions disposed in a lower portion of the series, and at all times within the body of liquid, and a single junction of the said plurality, but remote therefrom, as for example located outside tank 12, or in any case, outside the liquid body, as junction 51. Junctions 19p and 51 are connected in the said second circuit by constantan lead 52. Copper leads 53 and 61 connect junction 51 across high resistance 56 with junction 19p via copper lead 54 to complete the said second circuit. The choke coil 59 in lead 53 and condenser 58 across leads 53 and 54 prevent the flow of alternating current through the said second circuit.

A third direct current circuit contains all of the plurality 17 of thermocouple junctions and is made up of copper lead 26 connected with junction 19a, secondary coil 24, leads 27 and 66, high resistance 63, and leads 62, 29, and 61 connected with constantan lead 52 to form junction 51. Flow of alternating current through the said third circuit is prevented by means of choke 60 in lead 66 and shunting condensers 28 and 64 across leads 62 and 66.

Computing circuit 71 is a balanced bridge circuit having potential applied from multiplying circuit 41 and the said third circuit in the first arm 72 thereof, and potential from the said second circuit in a second arm 73. Computing circuit further comprises a third arm 74 and a fourth arm 76, variable resistance 77 in arm 74 and if desired a fixed resistance 78 in arm 76. The computing circuit 71 further contains direct current amplifier 79 connected at point 87, connected to ground 88, between arms 72 and 73, via lead 84 and at point 31 between arms 74 and 76 via lead 83. The output of amplifier 79 actuates a motor 81 preferably of the same type as motor 46 described above, so as to rotate the motor shaft thereof. The shaft of motor 81 is operatively connected with a wiper 82 so as to move wiper 82 across variable resistance 77 to balance the circuit. The ground connections 88 and 68 are points which separate potentials produced in the said second and third circuits, the currents in which oppose each other in the computing circuit bridge 71.

The various voltages produced in carrying out my invention are discussed and represented mathematically herebelow in order to further clarify the purpose and use of the various electrical circuits described above:

$e_o$ = direct current output potential developed by the entire series of thermocouples, i. e., the third circuit,
$e_A$ = direct current potential developed by any one of the hot junctions in the plurality 17, above the liquid,
$e_c$ = direct current potential developed by any one of the cold junctions 18,
$e_L$ = direct current potential developed by any one of the junctions 19 within the body of liquid,
$N_A$ = number of hot junctions 19 above the level of the liquid body,
$N_L$ = number of hot junctions 19 within the liquid body,
$N$ = number of junctions 18, i. e., cold junctions in plurality 17.

In consideration of the above expressions, $$e_o = N_A e_A - N e_c + N_L e_L$$
$$e_o = (N - N_L) e_A + N_L e_L - N e_c$$
$$e_o = N(e_A - e_c) - N_L(e_A - e_L)$$

Setting $C_1$ equal to $e_A - e_c$, and $C_2$ equal to $e_A - e_L$, then $$e_o = N C_1 - N_L C_2$$

Therefore $$N_L = \frac{N C_1 - e_o}{C_2}$$

which value, $N_L$, is indicative of the level of liquid in the tank 12.

By means of the plurality of thermocouples and associated circuits described above, the value of $N_L$ is determined and indicated by the position of wiper 82 on variable resistance 77 in the computing circuit 71. The position of wiper 82 on resistance 77 is indicated on an arbitrary scale 91 which is calibrated as desired, as for example in terms of gallons, barrels, or the like. Obviously one end of scale 91 registers "full" and the other end registers "empty" and points intermediate these two are indices representing the actual level of the liquid in tank 12. The value of $e_o$ is applied across resistance 63. It is only necessary to subtract this voltage from $NC_1$. $C_1$ is obtainable from the leads 38 and 39 and is multiplied by N by means of the multiplying circuit 41 already described. Accordingly a voltage equal to $NC_1 - e_o$ will be applied to one side of the balanced bridge circuit 71 on one side of ground 88. On the opposite side of ground 88 the value of $C_2$ is directly obtainable and is applied across resistance 56. The bridge or balanced circuit is completed if necessary by resistance 78 opposite resistance 56, and variable resistance 77 opposite resistance 63. Amplifier 79 feeds motor 81 which operates as above described to vary the resistance of resistance 77 to restore balance in the computing circuit, when changes occur in liquid level 14. Thus due to change in the level of the liquid in tank 12, the values of $e_o$, $C_1$, and $C_2$ change, causing the unbalance of the computing circuit, and due to this unbalance amplifier 79 feeds current to motor 81 to operate wiper 82 to restore bridge balance. The arm of the computing circuit which is adjusted by motor 81 operating wiper 82 across resistance 77 can be associated with a dial graduated in terms of $N_L$ as described above to provide a constant reading indicative of the level 14 of liquid in tank 12.

Various means other than the specific multiplying circuit 41 illustrated can be used to determine $NC_1$. For example, a galvanometer connected in place of amplifier 44 to leads 38 and 39 can be utilized to have its needle reflect light into a plurality of photoelectric cells which operate to cut in or out resistance in a multiplying circuit used in place of potentiometer 48. The voltage $C_1$ can be amplified by a suitable direct current amplifier, so long as the amplification is equal to N and can be applied directly to the computing circuit if properly poled to effect a subtraction of $e_o$ from $NC_1$.

With reference to Figure 2, a plurality of separate thermocouple junction pairs 101, e. g., copper-constantan, are spaced apart in an upright direction and each connected with a selector switch 102. Alternating current is passed through each thermocouple junction pair 101 from alternating current source 103, so as to heat each such junction pair. Switch 102 (also with reference to Figure 3) contains resistances 100 as shown in the drawings connecting the contacts, thereby allowing alternating current to pass simultaneously through all the junction pairs so as to heat them. The signal from the specific thermocouple pair observed will flow directly to the indicator 104, that path offering least resistance to the signal. The selector switch 102 is connected with an E. M. F. indicating means 104 to separately indicate the direct current potential generated by each of the thermocouple junction pairs 101. A choke coil 106 is connected in series with indicating means 104, and ground and condenser 107 shunts 104, thus allowing alternating current to by-pass the indicating means 104. In this embodiment those junctions above the liquid produce a zero potential since both junctions are heated and cooled by the same amount. The same applies to those pairs of junctions 101 within the liquid body. Whenever the liquid level 14 is between two of the junctions of a given pair, the junction below the liquid level is cooled to a further degree than the other junction, i. e., the one above the liquid, thus causing a potential to be produced. It is advantageous that a single junction of each pair be on the same horizontal level with an adjacent single junction of the adjacent pair as indicated at 101b—101c, 101d—101e, 101f—101g, 101h—101i, and the like. As an indicating means 104, an oscilloscope is advantageously employed. In that case, as the switch 102 is rotated there will be no indication on the oscilloscope until the thermocouple junction pair having one junction above and the other junction below the liquid level is connected into the circuit. That thermocouple junction pair develops a potential which will appear as a pip on the oscilloscope, as for example pip 109 formed as a result of liquid level 14 being intermediate junctions 101e and 101d. No other pip is indicated on the oscilloscope since obviously no other pairs of junctions develop a potential at a common temperature.

With reference to Figure 3, a plurality of hot junctions 111 is disposed in the liquid storage tank 12 so as to be positioned in part within the body of liquid and in remaining part in the adjacent space above. Junctions 111 are hot junctions and have a common cold junction preferably contained in the indicating instrument 104, or if desired disposed in an insulated rod or support 10' of the type illustrated in Figure 1 (see side wall 10) and in the manner described therein. Those hot junctions 111 below liquid level 14 are cooled by liquid to an extent less than that to which those hot junctions above the liquid level 14 are cooled. Selector switch 102, indicating means 104, lead 108 and choke coil 106 and condenser 107 are for the same purpose as described in Figure 2. As in the case of Figure 2, an oscilloscope is advantageously employed as the indicating means 104 in the embodiment of Figure 3. In such a case the oscilloscope will show the location of the first hot junction being cooled and thus indicate the level of the liquid. In this embodiment there is a marked break in the amplitude of the pips indicated on the oscilloscope by the hot junctions above the liquid and those below the liquid level thus continuously indicating the level of liquid in tank 12.

As will be evident to those skilled in the art, various modifications can be made or followed, in the light of the foregoing disclosure and discussion, without departing from the spirit or scope of the disclosure or from the scope of the claims.

I claim:

1. A liquid level gauge assembly comprising a plurality of thermocouple junctions connected in series and alternately as hot and cold junctions and disposed in close proximity to one another successively in an upright direction, from a point within the body of the said liquid to a point above same; an alternating current circuit containing said series of thermocouples; a first direct current circuit containing a single pair of said plurality of junctions in an upper portion of said series; a second direct current circuit containing a single pair of said plurality of junctions disposed in a lower portion of said series, the last said pair comprising one of said hot junctions and a junction remote from said plurality, and filtering means in said second circuit for preventing flow of alternating current therethrough; a third direct current circuit containing all of said plurality of junctions; a multiplying circuit in communication with said first direct current circuit for determining the product of the number of cold junctions in said plurality and the E. M. F. in said first circuit; a computing circuit; said multiplying circuit being connected in said computing circuit together with said first and second circuits, for determining the quotient of the difference between said product and the total E. M. F. generated in said third circuit, and the total E. M. F. generated in said second circuit; and means for indicating said quotient as an index of said liquid level.

2. The apparatus of claim 1 wherein said computing circuit comprises a self-balancing bridge circuit.

3. A liquid level gauge assembly comprising a plurality of thermocouple junctions connected in series alternately as hot and cold junctions and disposed in close proximity to one another successively in an upright direction, from a point within the body of the said liquid to a point above same; means for passing alternating current through said plurality of junctions; a first direct current circuit containing a single pair of said junctions disposed in an upper portion of said series, and filtering means in said first circuit for preventing flow of alternating current therethrough; a second direct current circuit containing a single pair of said plurality of junctions disposed in a lower portion of said series, the last said pair comprising one of said hot junctions and a junction remote from said plurality, and filtering means in said second circuit for preventing flow of alternating current therethrough; a third direct current circuit containing all of said plurality of said thermocouple junctions and filtering means in said third circuit for preventing flow of alternating current therethrough; a multiplying circuit in communication with said first direct current circuit for determining the product of the potential across said first circuit and the number of cold junctions in said plurality, a balanced computing bridge circuit having potential applied from said multiplying and third circuits in a first arm, and potential from said second circuit in its second arm; a resistance in a third arm of said computing circuit opposite to said first arm, variable in response to a change in potential in said first and second arms, for determining the quotient of the difference between said product potential and the E. M. F. in said third circuit, and the E. M. F. generated in said second circuit; a fourth arm in said computing circuit connecting said second and third arms, and means for indicating said quotient as an index of said liquid level.

4. The apparatus of claim 3 wherein a fixed resistance is inserted in said fourth arm.

5. The apparatus of claim 3 wherein said multiplying circuit comprises a direct current circuit containing a variable resistance and an E. M. F. across same equal to the product of the maximum possible E. M. F. of said first circuit and the number of cold junctions in said plurality of junctions, and wherein said multiplying circuit is maintained in communication with said first circuit by a direct current amplifier connected with said first circuit and operatively connected with a motor so as to rotate the shaft thereof in response to the potential applied to said amplifier from said first circuit, and a wiper operatively connected to the shaft of said motor and adapted to be moved over the last said variable resistance in response to potential applied to said direct current amplifier, and wherein the last said variable resistance adjusted by said wiper interconnects said third circuit with said computing circuit.

6. The apparatus of claim 3 wherein said computing circuit contains a direct current amplifier connected at a point between said first and second arms and a point between said third and fourth arms, and wherein the output of the amplifier actuates a motor so as to rotate the motor shaft, and wherein said shaft is operatively connected with a wiper to adjust said variable resistance.

7. The apparatus of claim 3 wherein said cold junctions are disposed electrically insulated in an upright container having high heat capacity.

8. Apparatus for continuously measuring the level of a body of liquid, comprising a plurality of thermocouple pairs disposed in close proximity to one another successively in an upright direction from a point within said body of liquid to a point above same; means for passing alternating current simultaneously through all of said plurality of thermocouple pairs so as to heat same, means for measuring amounts of direct current generated by said plurality of thermocouple pairs and for indicating same as an index of said liquid level.

9. A liquid level gauge assembly comprising a selector switch, a plurality of separate thermocouple junction pairs spaced apart in an upright direction and each connected with said selector switch, means for passing alternating current simultaneously through all of said thermocouple pairs so as to heat same, means operatively connected with said selector switch for indicating E. M. F., and filter means interconnected with said switch and said indicating means for preventing passage of alternating current into said indicating means.

10. A liquid level gauge assembly comprising a selector switch, a plurality of separate thermocouple junction pairs spaced apart in an upright direction and having a common cold junction and each connected with said selector switch, means for passing alternating current simultaneously through all of said junction pairs so as to heat same, means operatively connected with said switch for continuously indicating E. M. F., and filter means interconnected with said switch and said indicating means for preventing passage of alternating current to said indicating means.

References Cited in the file of this patent

UNITED STATES PATENTS

| | | |
|---|---|---|
| 1,650,986 | Herthel et al. | Nov. 29, 1927 |
| 1,775,540 | Taylor | Sept. 9, 1930 |
| 2,279,043 | Harrington | Apr. 7, 1942 |
| 2,474,192 | Schlesman | June 21, 1949 |
| 2,540,822 | Hastings | Feb. 6, 1951 |